(12) United States Patent
Chung et al.

(10) Patent No.: US 11,799,556 B2
(45) Date of Patent: Oct. 24, 2023

(54) OPTICAL-TIME-DIVISION-MULTIPLEXED TRANSMISSION SYSTEM USING SINUSOIDALLY MODULATED OPTICAL SIGNAL AS INPUT PULSE SOURCE

(71) Applicant: KOREA ADVANCED INSTITUTE OF SCIENCE AND TECHNOLOGY, Daejeon (KR)

(72) Inventors: Yun Chur Chung, Daejeon (KR); Sunghyun Bae, Daejeon (KR); Byunggon Kim, Daejeon (KR); Minsik Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 3 days.

(21) Appl. No.: 17/631,412

(22) PCT Filed: Feb. 26, 2020

(86) PCT No.: PCT/KR2020/002758
§ 371 (c)(1),
(2) Date: Jan. 28, 2022

(87) PCT Pub. No.: WO2021/020684
PCT Pub. Date: Feb. 4, 2021

(65) Prior Publication Data
US 2022/0278751 A1 Sep. 1, 2022

(30) Foreign Application Priority Data

Jul. 30, 2019 (KR) ........................ 10-2019-0092208

(51) Int. Cl.
*H04B 10/524* (2013.01)
*H04B 10/2581* (2013.01)
(Continued)

(52) U.S. Cl.
CPC ....... *H04B 10/524* (2013.01); *H04B 10/2581* (2013.01); *H04B 10/504* (2013.01); *H04J 14/08* (2013.01); *H04L 25/03891* (2013.01)

(58) Field of Classification Search
CPC .............. H04B 10/524; H04B 10/2581; H04B 10/504; H04B 2210/003; H04B 10/5161;
(Continued)

(56) References Cited

U.S. PATENT DOCUMENTS 6,445,476 B1 * 9/2002 Kahn ................... H04B 10/505
398/189
6,865,348 B2 * 3/2005 Miyamoto ......... H04B 10/5055
398/189

(Continued)

FOREIGN PATENT DOCUMENTS

CN 104333419 A * 2/2015
GB PCT/GB2020/050476 * 3/2019
(Continued)

OTHER PUBLICATIONS

Samani, Alireza et al. A Silicon Photonic PAM-4 Modulator Based on Dual-Parallel Mach-Zehnder Interferometers. IEEE Photonics Journal vol. 8, No. 1, Feb. 2016, See sections 1, 2 and 3.2: and figures 2 and 4.

(Continued)

*Primary Examiner* — Abbas H Alagheband
(74) *Attorney, Agent, or Firm* — BROADVIEW IP LAW, PC (57) ABSTRACT

Disclosed are an optical-time-division-multiplexed transmission method and system using a simple sinusoidally modulated optical signal as an input pulse source. An optical-time-division-multiplexed transmission system comprises: an optical-time-division-multiplexed transmitter by applying a sinusoidal electrical signal, a first multi-level (Continued)

electrical PAM signal, and a second multi-level electrical PAM signal so as to generate an optical-time-division-multiplexed multi-level PAM signal; an optical detector for converting the transmitted optical-time-division-multiplexed PAM signal into an electrical signal; a time-division-demultiplexer for demultiplexing the detected electrical signal into two signals; a MIMO equalizer; and two decision elements for determining the levels of two demultiplexed signals obtained from the MIMO equalizer.

15 Claims, 8 Drawing Sheets (51) Int. Cl.
   *H04B 10/50* (2013.01)
   *H04J 14/08* (2006.01)
   *H04L 25/03* (2006.01)
(58) Field of Classification Search
   CPC ..... H04B 10/541; H04B 10/612; H04J 14/08; H04J 14/086; H04L 25/03891; H04L 25/14; G02B 6/12
   USPC .......................................................... 398/28
   See application file for complete search history.

(56) References Cited

U.S. PATENT DOCUMENTS

| | | | |
|---|---|---|---|
| 7,321,733 B2 | 1/2008 | Ikushima et al. | |
| 7,398,022 B2* | 7/2008 | Zitelli .................. | H04B 10/505 398/189 |
| 2003/0223762 A1* | 12/2003 | Ho ...................... | H04L 25/4917 398/186 |
| 2005/0271394 A1* | 12/2005 | Whiteaway ...... | H04B 10/25133 398/188 |
| 2010/0060972 A1* | 3/2010 | Kucharski .......... | H04B 10/5161 359/290 |
| 2010/0316391 A1* | 12/2010 | Shastri ................. | H04B 10/801 398/141 |
| 2012/0224867 A1* | 9/2012 | Kang ...................... | H04J 14/02 398/202 |
| 2012/0315036 A1* | 12/2012 | Kucharski ............. | G02F 1/2255 398/186 |
| 2014/0301736 A1* | 10/2014 | Huh ..................... | H04B 10/541 398/115 |
| 2016/0218811 A1* | 7/2016 | Chen .................... | H04L 27/362 |
| 2018/0205464 A1* | 7/2018 | Broekaert ........... | H04B 10/541 |
| 2019/0319712 A1* | 10/2019 | Zhang ................ | H04B 10/5161 |
| 2020/0174514 A1* | 6/2020 | Amiralizadeh ...... | H04B 10/588 |
| 2021/0211202 A1* | 7/2021 | Tsai ...................... | G02F 1/0123 |
| 2022/0149967 A1* | 5/2022 | Ferrari ............. | H04B 10/25137 |

FOREIGN PATENT DOCUMENTS

| | | | | |
|---|---|---|---|---|
| JP | 2006-527571 A | | 11/2006 | |
| KR | 20140061129 A | * | 5/2014 | ......... H04B 10/5053 |

OTHER PUBLICATIONS

Kawakami, Hiroto et al. Novel Optimizing Technique for Linear Optical Mach-Zehnder Modulator and Its Experimental Verification using PAM-8 Signal. Proceedings of 2018 European Conference on Optical Communication (ECOC). Sep. 23-27, 2018. See p. 3: and figures 1 and 4-6.
Morsy-Osman, Mohamed et al. 224 GB/s 10 km Transmission of PDM PAM-4 at 1.3 μm Using a Single Intensity-Modulated Laser and a Direct-Detection MIMO DSP-based Receiver. Journal of Lightwave Technology. vol. 33, No. 7, pp. 1417-1424, Apr. 2015. See abstract; and section II.
International Search Report dated Jun. 23, 2020.
Office Action of KR 10-2019-0092208 dated May 28, 2020 from Korean Patent Intellectual Property Office (KIPO).

* cited by examiner

OPTICAL-TIME-DIVISION-MULTIPLEXED TRANSMISSION SYSTEM USING SINUSOIDALLY MODULATED OPTICAL SIGNAL AS INPUT PULSE SOURCE

CROSS-REFERENCE TO RELATED APPLICATIONS

This application is the U.S. National Stage filing under 35 U.S.C. 371 of International Application No. PCT/KR2020/002758, filed on Feb. 26, 2020, which claims priority to Korean Patent Application No. 10-2019-0092208, filed on Jul. 30, 2019, all of which are hereby incorporated by reference in their entirety.

TECHNICAL FIELD

The disclosure relates to a system and a method using a sinusoidally modulated optical signal in order to cost-efficiently establish an optical-time-division multiplexed scheme in a local area optical network.

BACKGROUND ART

Currently, 100 Gigabit Ethernet is generally used in a local area network. In 100 Gigabit Ethernet, four 25 Gb/s on-off-keying (OOK) signals are transmitted by wavelength division multiplexing. An OOK is a simplest modulation method and enables a communication network to be cost/energy-efficiently established due to a simple structure of a transceiver. However, as data traffic in a local area network, such as a data center, is rapidly increasing nowadays, not only 400 Gigabit Ethernet that transmits a 100 Gb/s signal per channel is required but it is also expected that 1 Terabit Ethernet will be required soon. However, when a high-speed signal is modulated by OOK, an optical transceiver needs to have a very wide bandwidth. Since it is not easy to make an optical transmitter with a wide bandwidth, a 4-level pulse-amplitude modulation (PAM4) signal with excellent frequency efficiency is used. A PAM4 signal has excellent frequency efficiency and relatively low complexity and is thus suitable for a cost-sensitive local area network. However, even though a PAM4 signal is applied, an optical transmitter with a bandwidth of 40 GHz is required to generate a 100 Gb/s signal. If speed is further increased to generate a 200 Gb/s signal, an optical transmitter with a bandwidth of as much as 80 GHz is required. However, it is not easy to manufacture an optical transmitter with such a wide bandwidth.

To solve this problem, an optical-time-division multi-plexed technique may be used. To apply the optical-time-division technique, it is necessary to generate an optical pulse with a high extinction ratio, a high repetition rate, and low jitter, but it is not easy to generate such a pulse. For example, an actively mode-locked laser may be used to generate an optical pulse with a high repetition rate. However, to reduce jitter, a complex circuit is required to stably control the resonance distance of the laser. Another method is generating a pulse using two modulators and a dispersion compensating fiber. However, since a long-distance dispersion compensating fiber is required, it is difficult to achieve integration, using the two modulators causes a significant insertion loss, and the level of an electrical signal to modulate the two modulators needs to be great.

DISCLOSURE OF INVENTION

Technical Problem

In a short-range optical transmission system, since a transmission speed required per channel is rapidly increasing, even though a PAM4 modulation method is used, an optical transmitter needs to have a very wide bandwidth to generate a signal with a single optical transmitter. However, it is known that the bandwidth of an optical receiver is relatively wider than that of an optical transmitter. A technical aspect of the disclosure is to provide a method and a system for cost-efficiently implementing an optical-time-division multiplexed technique when applying the technique to overcome the bandwidth limitation of an optical transmitter.

Solution to Problem

According to one aspect, an optical-time-division multi-plexed transmission system using a sinusoidally modulated optical signal as input pulse source proposed in the disclosure includes an optical-time-division-multiplexed transmitter to generate an optical-time-division-multiplexed multi-level PAM optical signal by applying a sinusoidal electrical signal, a first multi-level electrical PAM signal, and a second multi-level electrical PAM signal, an optical detector to convert the optical-time-division-multiplexed PAM signal transmitted through an optical fiber into an electrical signal, a time-division demultiplexer to demultiplex the electrical signal detected by the optical detector into two signals and to apply a MIMO equalizer to the signals, and two decision elements to determine the levels of two demultiplexed signals received from the MIMO equalizer.

According to an embodiment of disclosure, the optical-time-division-multiplexed transmitter includes a first external modulator to modulate the optical output of a laser using a sinusoidal electrical signal to generate a sinusoidally modulated optical pulse, an optical splitter to split the generated optical pulse into a first optical pulse and a second optical pulse, a second external modulator to modulate the first optical pulse by applying a first multi-level electrical PAM signal, and a third external modulator to modulate the second optical pulse by applying a second multi-level electrical PAM signal.

According to another embodiment of the disclosure, the optical-time-division-multiplexed transmitter includes a directly modulated laser to generate a sinusoidally modulated optical pulse by applying a sinusoidal electrical signal to the laser, an optical bandpass filter to pass only the wavelength component having a predetermined intensity or higher among the generated optical pulse to increase the extinction ratio of the optical pulse, an optical splitter to split the optical pulse that has passed through the optical bandpass filter into a first optical pulse and a second optical pulse, a first external modulator to modulate the first optical pulse by applying a first multi-level electrical PAM signal, and a second external modulator to modulate the second optical pulse by applying a second multi-level electrical PAM signal.

The optical-time-division-multiplexed transmitter further includes a time delay to subject the first optical pulse, modulated by the second external modulator, to a time delay by half a pulse period so that the multiplexed optical pulses are orthogonal to each other in the time domain, a domain converter to convert the domain of the second optical pulse, modulated by the third external modulator, so that the multiplexed optical pulses also operate in mutually orthogonal domains including I/Q, different polarizations, or spatial modes, and an optical coupler to generate an optical-time-division-multiplexed signal by combining the time-delayed first optical pulse and the phase-shifted second optical pulse.

To resolve the limitation of the extinction ratio of the sinusoidally modulated optical pulse that occurs by the bandwidth limitation of the external modulators, external modulators having a nonlinear transfer function are used, and a sinusoidal electrical signal with a predetermined amplitude or larger is applied so that the transfer function of the external modulators operate in the nonlinear region.

According to another aspect, an optical-time-division-multiplexed transmission method using a sinusoidally modulated optical pulse as input pulse source proposed in the disclosure includes generating an optical-time-division-multiplexed multi-level PAM optical signal through an optical-time-division-multiplexed transmitter by applying a sinusoidal electrical signal, a first multi-level electrical PAM signal, and a second multi-level electrical PAM signal, receiving the generated optical PAM signal and converting the received optical PAM signal into an electrical PAM signal through an optical detector, demultiplexing the electrical signal detected by an optical detector into two signals through a time-division demultiplexer, and applying a MIMO equalizer to the signals, and receiving the demultiplexed two signals from the MIMO equalizer and determining the levels of two signals by using two different decision elements.

According to an embodiment of the disclosure, the generating of the optical-time-division-multiplexed multi-level PAM signal through the optical-time-division-multiplexed transmitter by applying a sinusoidal electrical signal, the first multi-level electrical PAM signal, and the second multi-level electrical PAM signal includes generating a sinusoidally modulated optical pulse by modulating the optical output of a laser with a sinusoidal electrical signal through a first external modulator, splitting the generated optical pulse into a first optical pulse and a second optical pulse through an optical splitter, modulating the first optical pulse through a second external modulator by applying a first multi-level electrical PAM signal, and modulating the second optical pulse through a third external modulator by applying a second multi-level electrical PAM signal.

According to another embodiment of the disclosure, the generating of the optical-time-division-multiplexed multi-level PAM signal through the optical-time-division-multiplexed transmitter by applying a sinusoidal electrical signal, the first multi-level electrical PAM signal, and the second multi-level electrical PAM signal includes generating a sinusoidally modulated optical pulse by applying a sinusoidal electrical signal through a directly modulated laser; increasing the extinction ratio of the optical pulse by passing only the wavelength component having a predetermined intensity or higher among the generated optical pulse through an optical band pass filter; splitting the optical pulse that has passed through the optical band pass filter into a first optical pulse and a second optical pulse through an optical splitter; modulating the first optical pulse through a second external modulator by applying a first multi-level electrical PAM signal; and modulating the second optical pulse through a third external modulator by applying a second multi-level electrical PAM signal.

The generating of the optical-time-division-multiplexed multi-level PAM optical signal through the optical-time-division-multiplexed transmitter by applying the sinusoidal electrical signal, the first multi-level electrical PAM signal, and the second multi-level electrical PAM signal further includes subjecting the first optical pulse, modulated by the second external modulator, to a time delay by half a pulse period through a time delay so that the multiplexed optical pulses are orthogonal to each other in the time domain, converting the domain of the second optical pulse, modulated by the third external modulator, through a domain converter so that the multiplexed optical pulses also operate in mutually orthogonal domains including I/Q, different polarizations or spatial modes, and generating an optical-time-division-multiplexed signal through an optical coupler by combining the time-delayed first optical pulse and the phase-shifted second optical pulse.

Advantageous Effects of Invention

According to embodiments of the disclosure, it is possible to generate a high-speed multi-level PAM signal by cost-effectively applying an optical-time-division-multiplexed technique, and it is possible to receive the signal with a single optical receiver and to receive the signal by applying a low-complexity linear equalizer. In general, it is known that the bandwidth of an optical receiver is wider than that of an optical transmitter. However, since the maximum bandwidth of a currently commercialized optical receiver is not more than twice greater than the maximum bandwidth of an optical transmitter, two-channel multiplexing may optimize the performance of the optical receiver. Further, using a sinusoidally modulated optical pulse makes it possible to minimize the optical spectrum of a multiplexed signal, thus facilitating expansion by performing wavelength division multiplexing.

BEST MODE FOR CARRYING OUT THE INVENTION

An optical transmission method and an optical transmission system proposed in the disclosure are a transmission method and a transmission system for cost-efficiently generating an ultrahigh-speed optical signal by applying an optical-time-division-multiplexed scheme using a sinusoidally modulated optical pulse and receiving the same with a single optical receiver.

A sinusoidally modulated optical pulse has a pulse width corresponding to 50% of a pulse repetition rate. When the optical pulse is subjected to a time delay by half a pulse period, the optical pulse is orthogonal to an original optical pulse in a time domain. Accordingly, by modulating the optical pulse and the delayed optical pulse, two return-to-zero (RZ) optical signals orthogonal to each other may be obtained. However, when these two RZ optical signals operate in the same domain (i.e., in the same spatial mode, the wavelength, the same polarization, the same in-phase/quadrature (I/Q) domain), a beating occurs in a symbol transition area when receiving the RZ optical signals by one optical receiver, and thus the signals are significantly distorted. To solve this problem, when the two RZ optical signals are subjected to optical-time-division-multiplexing, the two RZ optical signals are operated in different spatial modes, polarizations, or I/Q domains.

Even though the high-speed optical signals are generated in this manner, if the extinction ratio of the generated pulse is not large enough, inter-symbol interference (ISI) occurs in the multiplexed optical signals. The extinction ratio of the pulse may arise by bandwidth limitation of an optical transmitter. One method for overcoming this problem is a method of increasing the extinction ratio of the optical pulse by employing a modulator having a nonlinear transfer function and applying a sinusoidal electric signal with a large amplitude so that the transfer function of the optical modulator operates in a nonlinear area. Another method is using a linear equalizer in the receiver. Since the two different RZ optical signals operating in the different spatial modes, polarizations, or I/Q domains are combined in a time-division multiplexing process, optical power is linearly combined, thus effectively eliminating the ISI caused by inter-channel interference with the linear equalizer.

When an optical-time-division-multiplexed technique is applied in a signal generation device, if average optical power between two RZ optical signals is different, applying the same determination level to each channel when determining the level of a received signal may rapidly increase the bit error rate of the signal. In order to overcome this problem, an electrical signal received by an optical detector may be subjected to time-division demultiplexing in an electrical domain and may be determined by a plurality of decision devices. To further improve signal quality, a multiple-input multiple-output (MIMO) equalizer may be additionally applied. Hereinafter, embodiments of the disclosure will be described in detail with reference to the accompanying drawings.

Figure 1:
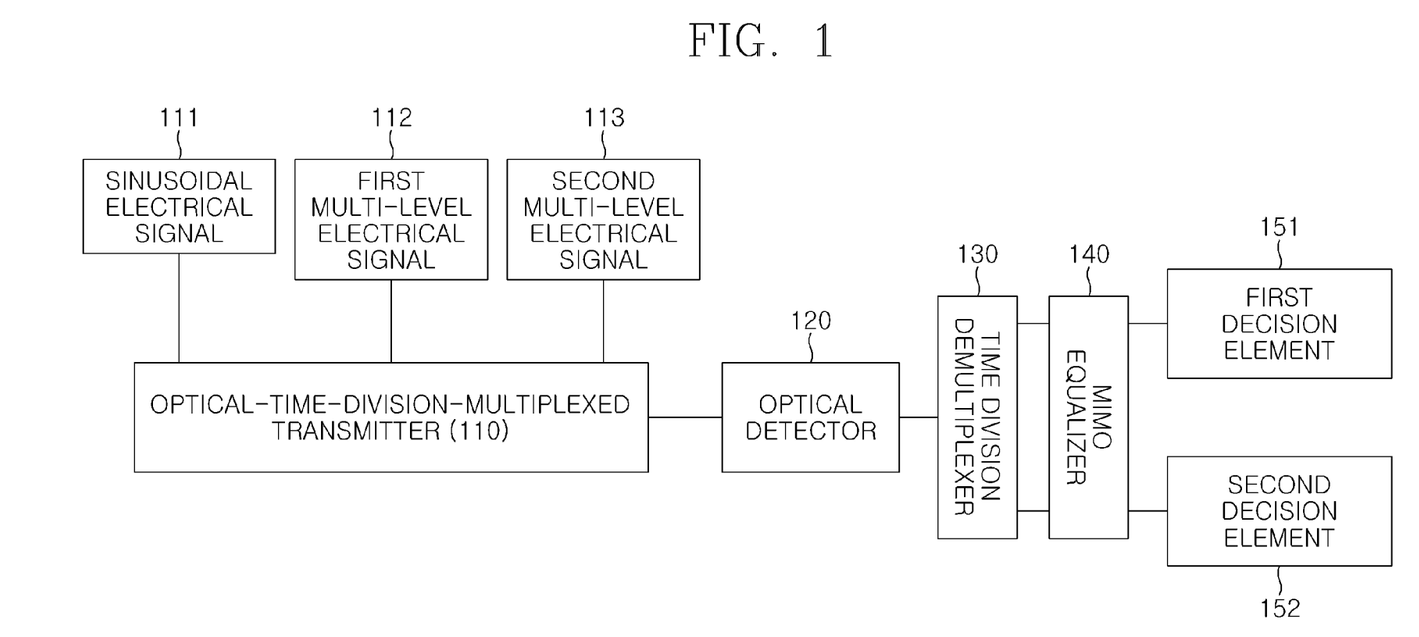
FIG. 1 illustrates the configuration of an optical-time-division-multiplexed transmission system using a sinusoidally modulated optical pulse as input pulse source according to an embodiment of disclosure.

FIG. 1 illustrates the configuration of an optical-time-division-multiplexed transmission system using a sinusoidally modulated optical pulse as input pulse source according to an embodiment of disclosure.

The disclosure is to establish cost-efficiently an optical-time-division-multiplexed technique using a sinusoidally modulated optical pulse and to receive the same with a single optical receiver. As the speed of a local area optical network rapidly increases, a transceiver with a wide bandwidth is required. Compared to an optical receiver, it is difficult to make an optical transmitter with a wide bandwidth. The disclosure is to overcome this problem by applying the optical-time-division-multiplexed technique. When a sinusoidally modulated optical pulse is subjected to a time delay by half a pulse period, the optical pulse is orthogonal to an original pulse. Two orthogonal RZ optical signals may be generated using these two pulses. However, when these two RZ optical signals are detected by one optical receiver, a beating may occur, in which case orthogonality is no longer established. Further, in an optical-time-division-multiplexed system, since the quality of a multiplexed signal depends on the quality of a used pulse, a pulse with a high extinction ratio is required. In an existing optical-time-division-multiplexed transmission system, since an OOK signal is generally used, the limitation of the extinction ratio of a pulse had an insignificant impact on the quality of a multiplexed signal. However, when a multi-level PAM signal is used, the limitation of the extinction ratio of a pulse exerts a rapidly increasing impact on the quality of a multiplexed signal, and thus a method for overcoming this problem needs to be proposed. The disclosure proposes a method of using an electrical equalizer in an optical receiver as a method for solving this problem.

The proposed optical-time-division-multiplexed transmission system using the sinusoidally modulated optical pulse as input pulse source includes an optical-time-division-multiplexed transmitter 110, an optical detector 120, a time-division demultiplexer 130, a MIMO equalizer 140, and two different determination elements 151 and 152.

The optical-time-division-multiplexed transmitter 110 applies one sinusoidal electrical signal 111, a first multi-level electrical signal 112, and a second multi-level electrical signal 113, thereby generating an optical-time-division-multiplexed ultrahigh-speed multi-level PAM optical signal. The ultrahigh-speed multi-level PAM optical signal is generated by the optical-time-division-multiplexed transmitter 110 using a sinusoidally modulated optical pulse.

The optical detector 120 receives the generated PAM optical signal through an optical fiber and converts the PAM optical signal into an electrical signal.

The time-division demultiplexer 130 demultiplexes the electrical signal detected by the optical detector into two signals and applies the signals to the MIMO equalizer 140.

The two different decision elements 151 and 152 receive the demultiplexed two signals from the MIMO equalizer 140, respectively, and determine the levels of two demultiplexed signals.

The performance of an optical-time-division multiplexed signal highly depends on the extinction ratio of an optical pulse, and the impact of the extinction ratio increases as the number of intensity levels of a PAM signal increases. This is because when the extinction ratio of the optical pulse is small, a signal of one channel affects a signal of an adjacent channel, resulting in ISI. The limitation of the extinction ratio of an optical pulse having intensity modulated with a sinusoidal electrical signal may occur by bandwidth limitation of a modulator.

One method for overcoming this problem is a method of using a modulator having a nonlinear transfer function (e.g., a Mach-Zehnder modulator or an electro-absorption modulator) and applying a sinusoidal electrical signal with a large amplitude so that the transfer function of the optical modulator operates in a nonlinear area. Since a sinusoidal electrical signal has only one frequency component, this method makes it possible to effectively increase the extinction ratio without distorting the pulse. Another method is using a linear equalizer. Since the two multiplexed RZ optical signals operate in different spatial modes, polarizations, or I/Q domains, the two RZ optical signals are linearly combined, thus effectively eliminating the ISI with the linear equalizer.

In an optical-time-division-multiplexed process, when two RZ optical signals are multiplexed to have the same optical power, the signals may be detected with an optical detector, one electrical equalizer may be applied, and then one decision element may be used. However, in the optical-time-division-multiplexed process, two channel signals may have different optical powers. To overcome the different optical powers, an electrical signal detected by an optical receiver may be subjected to time-division demultiplexing, a 2×2 MIMO equalizer may be applied, and two decision elements may be used.

This example is only an embodiment of the disclosure, and the structure of the receiver may be changed. A time-division demultiplexer and the 2×2 MIMO equalizer used in an optical detector may not be used depending on the quality of a generated optical signal.

Figure 2:
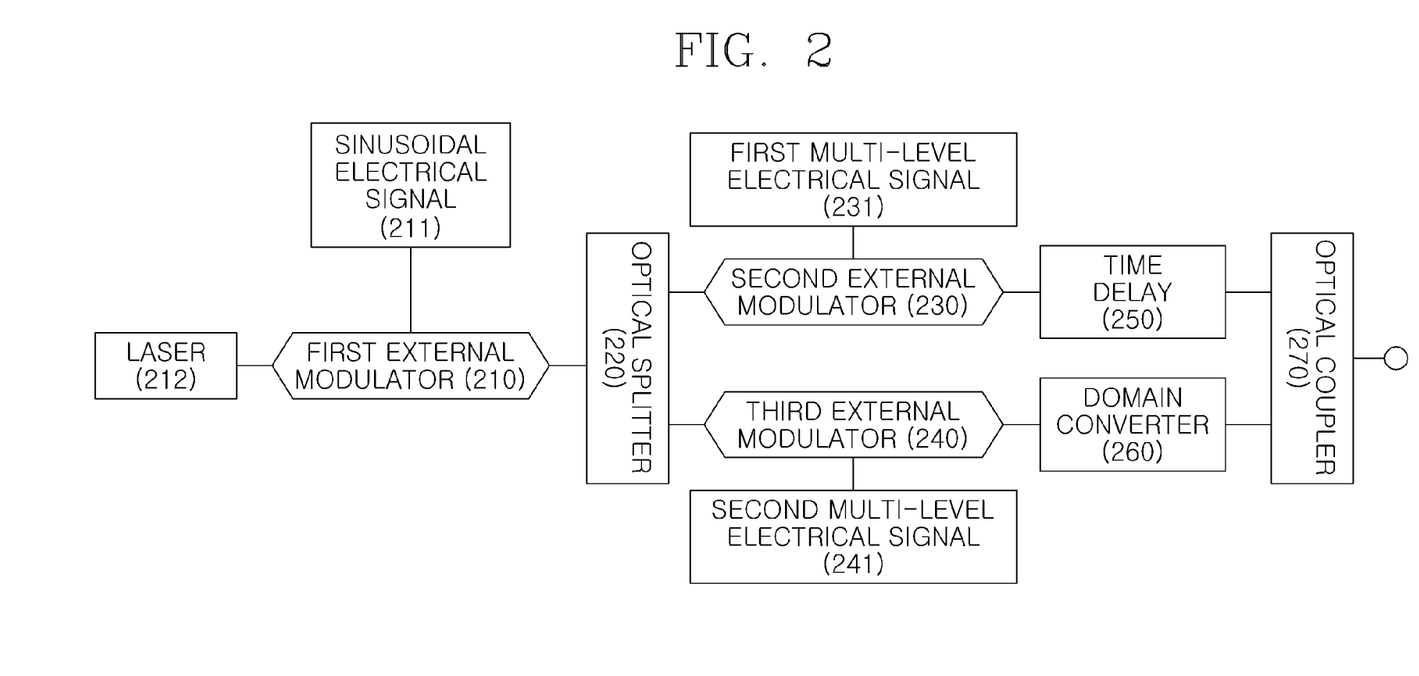
FIG. 2 illustrates the configuration of an optical-time-division-multiplexed transmitter using three external modulators according to an embodiment of the disclosure.

FIG. 2 illustrates the configuration of an optical-time-division-multiplexed transmitter using three external modulators according to an embodiment of the disclosure.

According to the embodiment of the disclosure, the optical-time-division-multiplexed transmitter includes a first external modulator 210, an optical splitter 220, a second external modulator 230, a third external modulator 240, a time delayer 250, a domain converter 260, and an optical coupler 270.

The first external modulator 210 modulates an optical signal of a laser 212 with an input sinusoidal electrical signal 211, thereby generating a sinusoidally modulated optical pulse.

The optical splitter 220 splits the generated optical pulse into a first optical pulse and a second optical pulse.

The second external modulator 230 modulates the first optical pulse by applying a first multi-level electrical signal 231.

The third external modulator 240 modulates the second optical pulse by applying a second multi-level electrical signal 241. It is assumed that an electric signal of a multi-level is applied to modulate a multi-level PAM signal.

The time delay 250 subjects the first optical pulse, modulated by the second external modulator, to a time delay by half a pulse period so that the multiplexed optical pulses are orthogonal to each other in a time domain. That is, one RZ-PAM signal is subjected to a time delay by half a pulse period so that two RZ-PAM optical signals generated through the second external modulator 230 and the third external modulator 240 are orthogonal to each other in the time domain.

The domain converter 260 converts a domain of the second optical pulse, modulated by the third external modulator, so that the multiplexed optical pulses operate in mutually orthogonal domains such as I/Q or different polarizations or spatial modes. That is, the domain of a different RZ-PAM optical signal is converted so that the two RZ-PAM optical signals operate in mutually orthogonal domains such as I/Q or different polarizations or spatial modes.

The optical coupler 270 generates a time-division multiplexed optical signal by combining the time-delayed first optical pulse and the phase-shifted second optical pulse, that is, the two RZ-PAM signals.

This configuration is only an embodiment of the disclosure, and the structure of the optical transmitter may be changed. For example, a polarization converter may be used instead of the domain converter so that the two RZ-PAM signals are in polarization domains orthogonal to each other.

Figure 3:
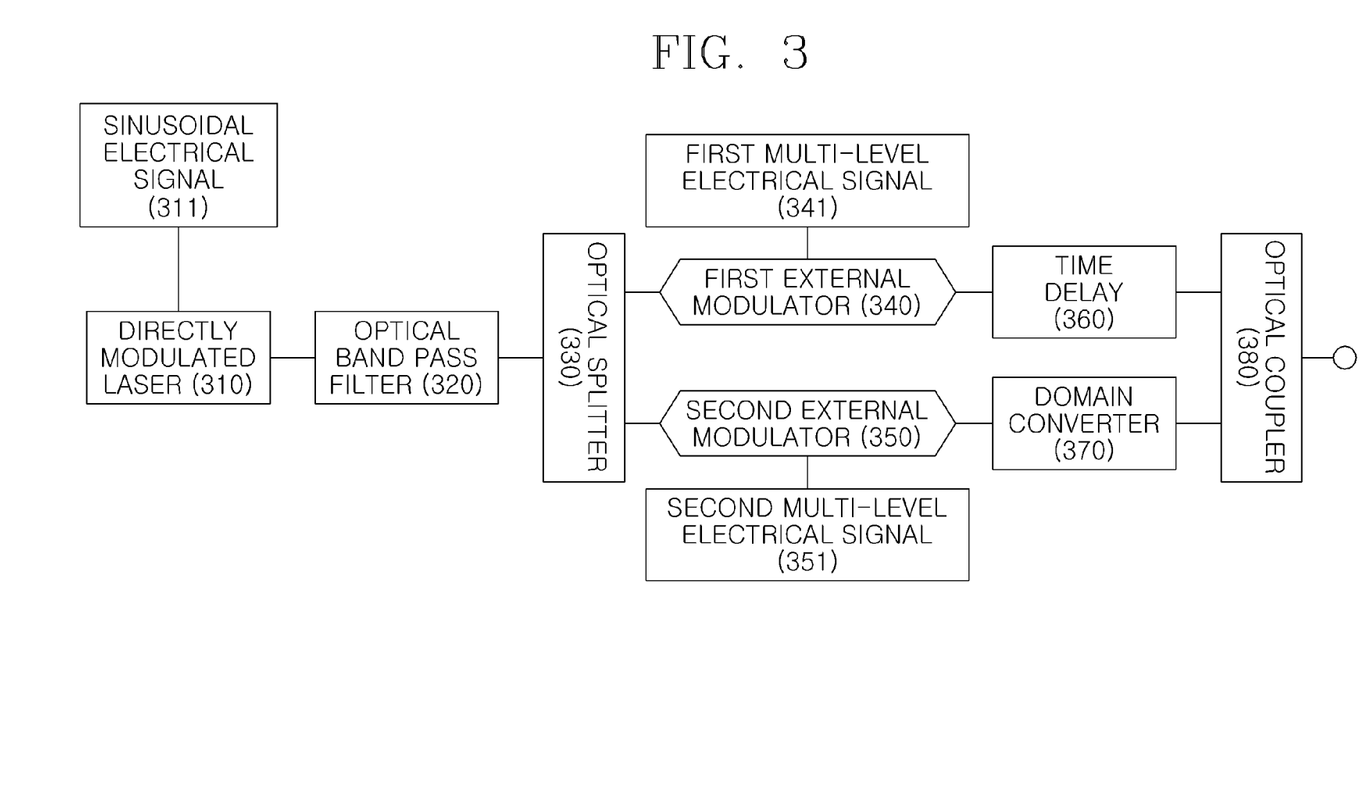
FIG. 3 illustrates the configuration of an optical-time-division-multiplexed transmitter using one direct modulation laser and two external modulators according to an embodiment of the disclosure.

FIG. 3 illustrates the configuration of an optical-time-division-multiplexed transmitter using one directly modulated laser and two external modulators according to an embodiment of the disclosure.

According to another embodiment of the disclosure, the optical-time-division-multiplexed transmitter includes a directly modulated laser 310, an optical band pass filter 320, an optical splitter 330, a first external modulator 340, a second external modulator 350, a time delay 360, a domain converter 370, and an optical coupler 380.

The directly modulated laser 310 modulates an optical signal with an input sinusoidal electrical signal 311, thereby generating a sinusoidally modulated optical pulse.

The optical band pass filter 320 passes only a wavelength component having a predetermined intensity or higher among the generated optical pulse, thereby increasing the extinction ratio of the optical pulse.

The optical splitter 330 splits the optical pulse that has passed through the optical band pass filter into a first optical pulse and a second optical pulse.

The first external modulator 340 modulates the first optical pulse by applying a first multi-level electrical signal 341.

The second external modulator 350 modulates the second optical pulse by applying a second multi-level electrical signal 351. It is assumed that an electric signal of a multi-level is applied to modulate a multi-level PAM signal.

The time delay 360 subjects the first optical pulse, modulated by the first external modulator, to a time delay by half a pulse period so that the multiplexed optical pulses are orthogonal to each other in a time domain. That is, one RZ-PAM signal is subjected to a time delay by half a pulse period so that two RZ-PAM optical signals generated through the first external modulator 340 and the second external modulator 350 are orthogonal to each other in the time domain.

The domain converter 370 converts the domain of the second optical pulse, modulated by the second external modulator, so that the multiplexed optical pulses operate in mutually orthogonal domains including I/Q, or different polarizations or spatial modes. That is, the domain of a different RZ-PAM optical signal is converted so that the two RZ-PAM optical signals operate in mutually orthogonal domains including I/Q, or different polarizations or spatial modes.

The optical coupler 380 generates a time-division-multiplexed optical signal by combining the time-delayed first optical pulse and the phase-shifted second optical pulse.

This configuration is only an embodiment of the disclosure, and the structure of the optical transmitter may be changed. For example, the optical band pass filter used to increase the extinction ratio may not be used.

Figure 4:
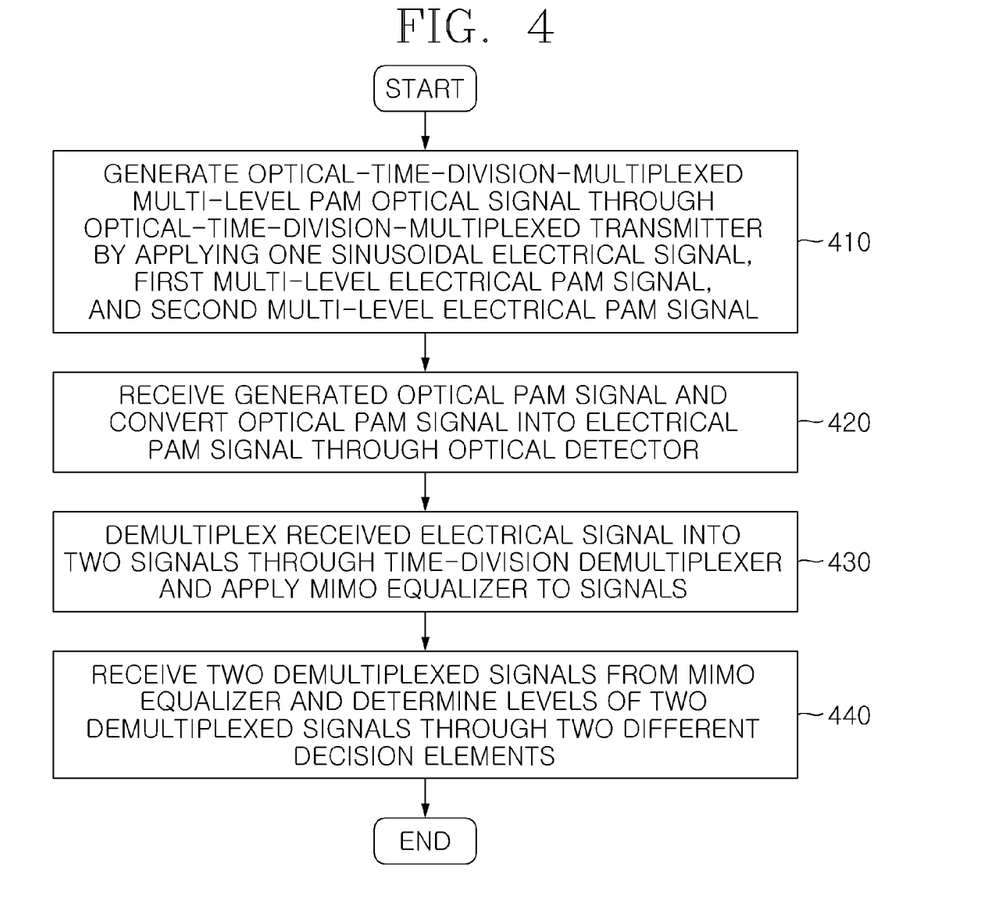
FIG. 4 is a flowchart illustrating an optical-time-division-multiplexed transmission method using a sinusoidally modulated optical pulse as input pulse source according to an embodiment of disclosure.

FIG. 4 is a flowchart illustrating an optical-time-division-multiplexed transmission method using a sinusoidally modulated optical pulse as input pulse source according to an embodiment of disclosure.

The proposed optical-time-division-multiplexed transmission method using the sinusoidally modulated optical pulse as input pulse source may include an operation 410 of generating an optical-time-division-multiplexed multi-level PAM optical signal through an optical-time-division-multiplexed transmitter by applying one sinusoidal electrical signal, a first multi-level electrical signal, and a second multi-level electrical signal, an operation 420 of receiving the generated PAM optical signal and converting the PAM optical signal into an electrical signal through an optical detector, an operation 430 of demultiplexing the received electrical signal into two signals through a time-division demultiplexer and applying a MIMO equalizer to the signals, and an operation 440 of receiving the two demultiplexed signals from the MIMO equalizer and determining the levels of two demultiplexed signals through two different decision elements.

In operation 410, an optical-time-division-multiplexed multi-level PAM optical signal is generated through an optical-time-division-multiplexed transmitter by applying one sinusoidal electrical signal, a first multi-level electrical signal, and a second multi-level electrical signal. The ultra-high-speed multi-level PAM optical signal is generated by the optical-time-division-multiplexed transmitter using a sinusoidally modulated optical pulse.

In operation 420, the generated PAM optical signal is received and converted into an electrical signal through an optical detector.

In operation 430, the received electrical signal is demultiplexed into two signals through a time-division demultiplexer and is applied to a MIMO equalizer. That is, the electrical signal detected by the optical detector is demultiplexed into two signals and is applied to the MIMO equalizer through the time-division demultiplexer.

In operation 440, the two demultiplexed signals are received from the MIMO equalizer, and the levels of two demultiplexed signals is determined through two different decision elements.

The performance of an optical time-division-multiplexed signal highly depends on the extinction ratio of an optical pulse, and the impact of the extinction ratio increases as the number of intensity levels of a PAM signal increases. This is because when the extinction ratio of the optical pulse is small, a signal of one channel affects a signal of an adjacent channel, resulting in ISI. The limitation of the extinction ratio of a sinusoidally modulated optical pulse may occur by bandwidth limitation of a modulator.

One method for overcoming this problem is a method of using a modulator having a nonlinear transfer function (e.g., a Mach-Zehnder modulator or an electro-absorption modulator) and applying a sinusoidal electrical signal with a large amplitude so that the transfer function of the optical modulator operates in a nonlinear area. Since a sinusoidal signal has only one frequency component, this method makes it possible to effectively increase the extinction ratio without distorting the pulse. Another method is using a linear equalizer. Since the two multiplexed RZ optical signals operate in different spatial modes, polarizations, or I/Q domains, the two RZ optical signals are linearly combined, thus effectively eliminating the ISI with the linear equalizer.

In an optical-time-division-multiplexed process, when two RZ optical signals are multiplexed to have the same optical power, the signals may be detected with an optical detector, one electrical equalizer may be applied, and then one determination element may be used. However, in the time-division-multiplexed process, two channel signals may have different optical powers. To overcome the different optical powers, an electrical signal detected by an optical receiver may be subjected to time-division demultiplexing, a 2×2 MIMO equalizer may be applied, and two decision elements may be used.

This example is only an embodiment of the disclosure, and the structure of the receiver may be changed. A time-division demultiplexer and the 2×2 MIMO equalizer used in an optical detector may not be used depending on the quality of a generated optical signal.

Figure 5:
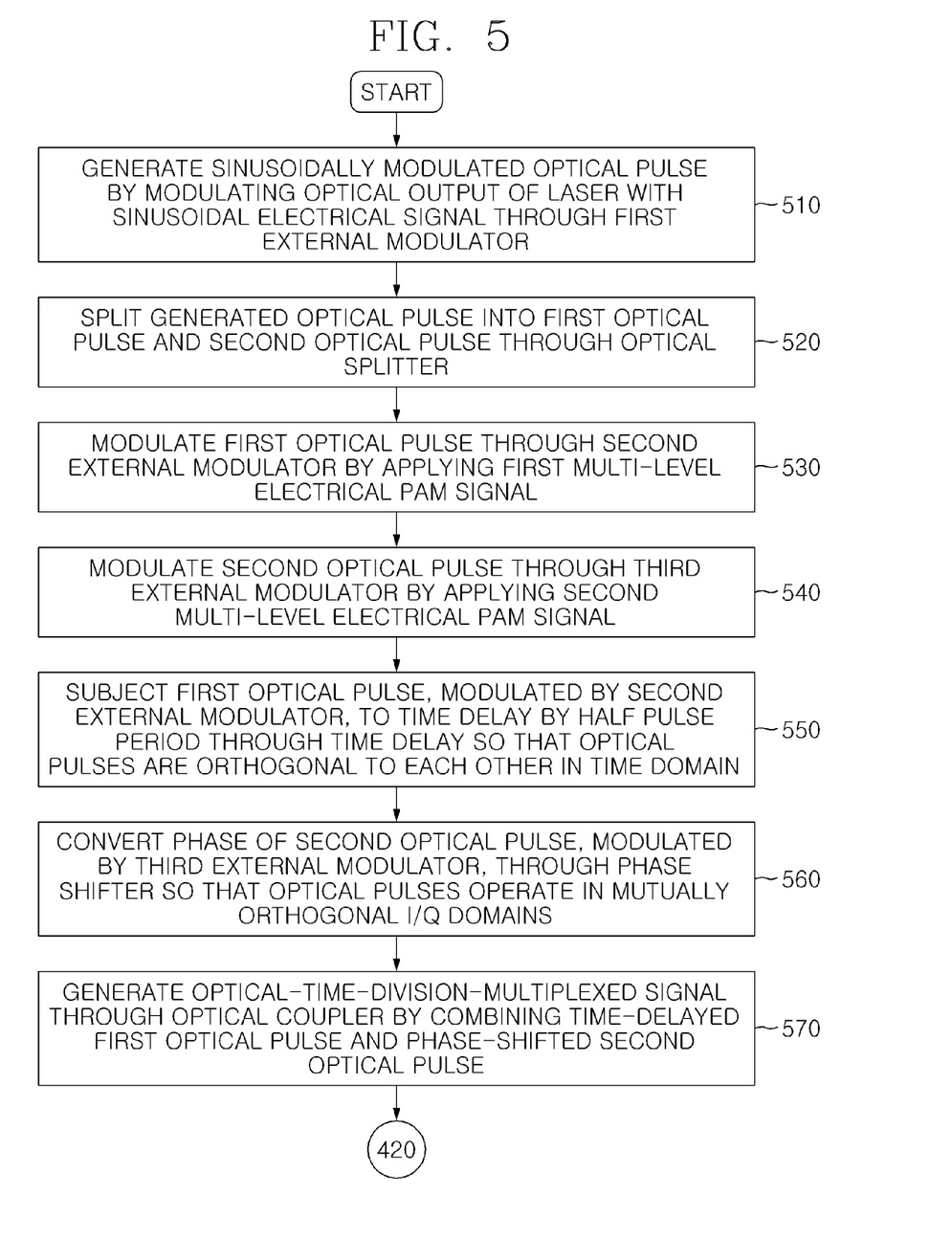
FIG. 5 is a flowchart illustrating a process of generating an optical-time-division-multiplexed multi-level PAM optical signal through an optical time-division-multiplexed transmitter according to an embodiment of the disclosure.

FIG. 5 is a flowchart illustrating a process of generating an optical time-division-multiplexed multi-level PAM optical signal through an optical-time-division-multiplexed transmitter according to an embodiment of the disclosure.

According to the embodiment of the disclosure, the process of generating the optical-time-division-multiplexed multi-level PAM optical signal through the optical-time-division-multiplexed transmitter may include an operation 510 of generating a sinusoidally modulated optical pulse by modulating an optical signal of a laser with a sinusoidal electrical signal through a first external modulator, an operation 520 of splitting the generated optical pulse into a first optical pulse and a second optical pulse through an optical splitter, an operation 530 of modulating the first optical pulse through a second external modulator by applying a first multi-valued level electrical signal, an operation 540 of modulating the second optical pulse through a third external modulator by applying a second multi-level electrical signal, an operation 550 of subjecting the first optical pulse, modulated by the second external modulator, to a time delay by half a pulse period through a time delay so that the multiplexed optical pulses are orthogonal to each other in a time domain, an operation 560 of converting a domain of the second optical pulse, modulated by the third external modulator, through a domain converter so that the multiplexed optical pulses operate in mutually orthogonal domains including I/Q or different polarizations or spatial modes, and an operation 570 of generating a time-division multiplexed optical signal through an optical coupler by combining the time-delayed first optical pulse and the phase-shifted second optical pulse.

In operation 510, an optical signal of a laser is modulated with a sinusoidal electrical signal through a first external modulator, thereby generating a sinusoidally modulated optical pulse.

In operation 520, the generated optical pulse is split into a first optical pulse and a second optical pulse through an optical splitter.

In operation 530, the first optical pulse is modulated through a second external modulator by applying a first multi-level electrical signal.

In operation 540, the second optical pulse is modulated through a third external modulator by applying a second multi-level electrical signal. It is assumed that an electric signal of a multi-level is applied to modulate a multi-level PAM signal.

In operation 550, the first optical pulse, modulated by the second external modulator, is subjected to a time delay by half a pulse period through a time delay so that the multiplexed optical pulses are orthogonal to each other in a time domain. That is, one RZ-PAM signal is subjected to a time delay by half a pulse period so that two RZ-PAM optical signals generated through the second external modulator and the third external modulator are orthogonal to each other in the time domain.

In operation 560, a domain of the second optical pulse, modulated by the third external modulator, is converted through a domain converter so that the multiplexed optical pulses operate in mutually orthogonal domains including I/Q or different polarizations or spatial modes. That is, the domain of a different RZ-PAM optical signal is converted so that the two RZ-PAM optical signals operate in mutually orthogonal domains including I/Q or different polarizations or spatial modes.

In operation 570, a time-division multiplexed optical signal is generated through an optical coupler by combining the time-delayed first optical pulse and the phase-shifted second optical pulse.

This example is only an embodiment of the disclosure, and the structure of the optical transmitter may be changed. For example, a polarization converter may be used instead of the domain converter so that the two RZ-PAM signals are in polarization domains orthogonal to each other.

Figure 6:
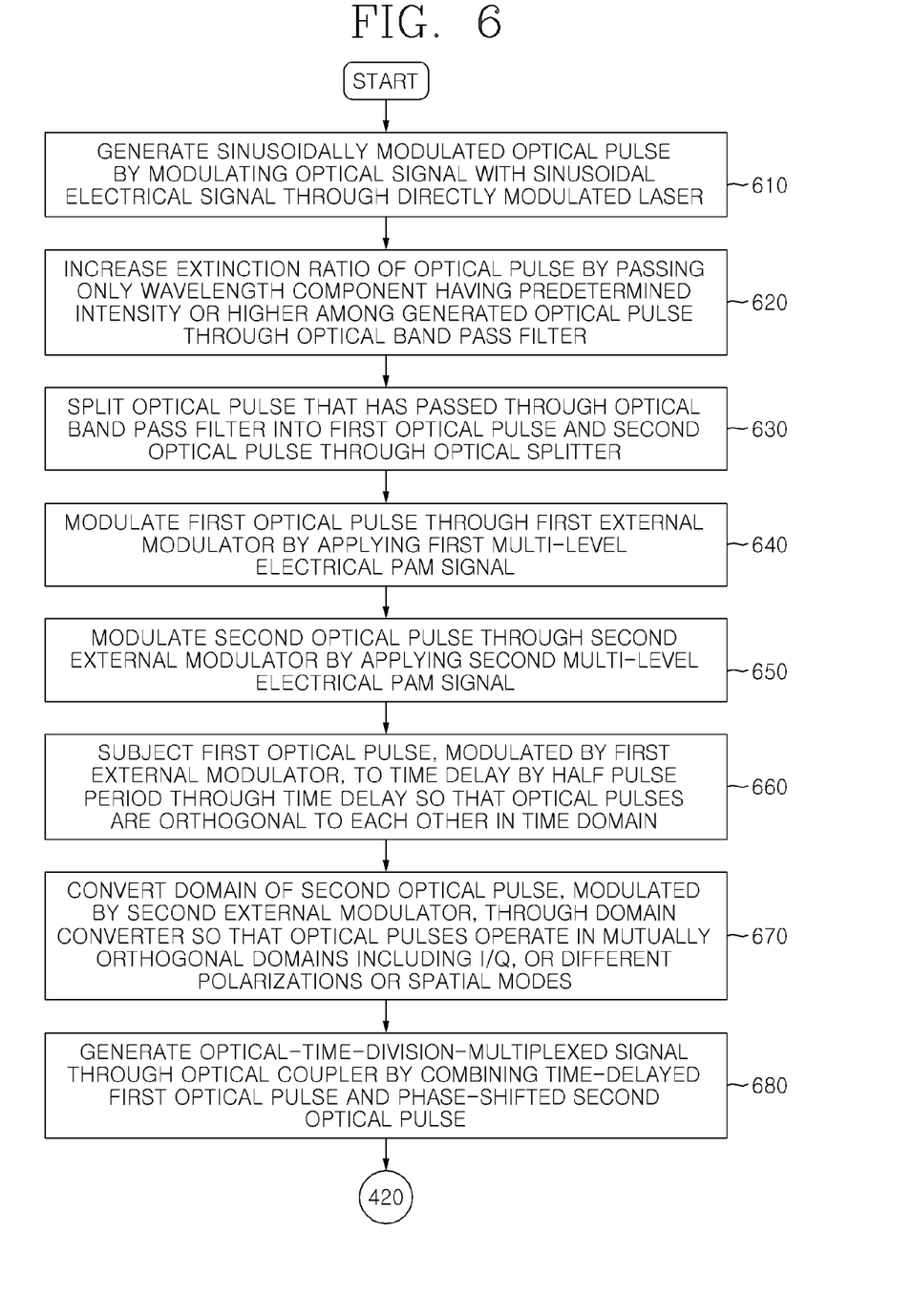
FIG. 6 is a flowchart illustrating a process of generating an optical time-division-multiplexed multi-level PAM optical signal through an optical time-division-multiplexed transmitter according to another embodiment of the disclosure.

FIG. 6 is a flowchart illustrating a process of generating an optical-time-division-multiplexed multi-level PAM optical signal through an optical-time-division-multiplexed transmitter according to another embodiment of the disclosure.

According to the other embodiment of the disclosure, the process of generating the optical-time-division-multiplexed multi-level PAM optical signal through the optical-time-division-multiplexed transmitter may include an operation 610 of generating a sinusoidally modulated optical pulse by modulating an optical signal with a sinusoidal electrical signal through a directly modulated laser, an operation 620 of increasing the extinction ratio of the optical pulse by passing only a wavelength component having a predetermined intensity or higher among the generated optical pulse through an optical band pass filter, an operation 630 of splitting the optical pulse that has passed through the optical band pass filter into a first optical pulse and a second optical pulse through an optical splitter, an operation 640 of modulating the first optical pulse through a first external modulator by applying a first multi-level electrical signal, an operation 650 of modulating the second optical pulse through a second external modulator by applying a second multi-level electrical signal, an operation 660 of subjecting the first optical pulse, modulated by the first external modulator, to a time delay by half a pulse period through a time delay so that the multiplexed optical pulses are orthogonal to each other in a time domain, an operation 670 of converting a domain of the second optical pulse, modulated by the second external modulator, through a domain converter so that the multiplexed optical pulses operate in mutually orthogonal domains including I/Q, or different polarizations or spatial modes, and an operation 680 of generating a time-division-multiplexed optical signal through an optical coupler by combining the time-delayed first optical pulse and the phase-shifted second optical pulse.

In operation 610, an optical signal is modulated with a sinusoidal electrical signal through a directly modulated laser, thereby generating a sinusoidally modulated optical pulse.

In operation 620, only a wavelength component having a predetermined intensity or higher among the generated optical pulse is passed through an optical band pass filter, thereby increasing the extinction ratio of the optical pulse.

In operation 630, the optical pulse that has passed through the optical band pass filter is split into a first optical pulse and a second optical pulse through an optical splitter.

In operation 640, the first optical pulse is modulated through a first external modulator by applying a first multi-level electrical signal.

In operation 650, the second optical pulse is modulated through a second external modulator by applying a second multi-level electrical signal. It is assumed that an electric signal of a multi-level is applied to modulate a multi-level PAM signal.

In operation 660, the first optical pulse, modulated by the first external modulator, is subjected to a time delay by half a pulse period through a time delay so that the multiplexed optical pulses are orthogonal to each other in a time domain. That is, one RZ-PAM signal is subjected to a time delay by half a pulse period so that two RZ-PAM optical signals generated through a first external modulator and the second external modulator are orthogonal to each other in the time domain.

In operation 670, a domain of the second optical pulse, modulated by the second external modulator, is converted through a domain converter so that the multiplexed optical pulses operate in mutually orthogonal domains including I/Q or different polarizations or spatial modes. That is, the domain of a different RZ-PAM optical signal is converted so that the two RZ-PAM optical signals operate in mutually orthogonal domains including I/Q or different polarizations or spatial modes.

In operation 680, a time-division multiplexed optical signal is generated through an optical coupler by combining the time-delayed first optical pulse and the phase-shifted second optical pulse.

This example is only an embodiment of the disclosure, and the structure of the optical transmitter may be changed. For example, the optical band pass filter used to increase the extinction ratio may not be used.

Figure 7A:
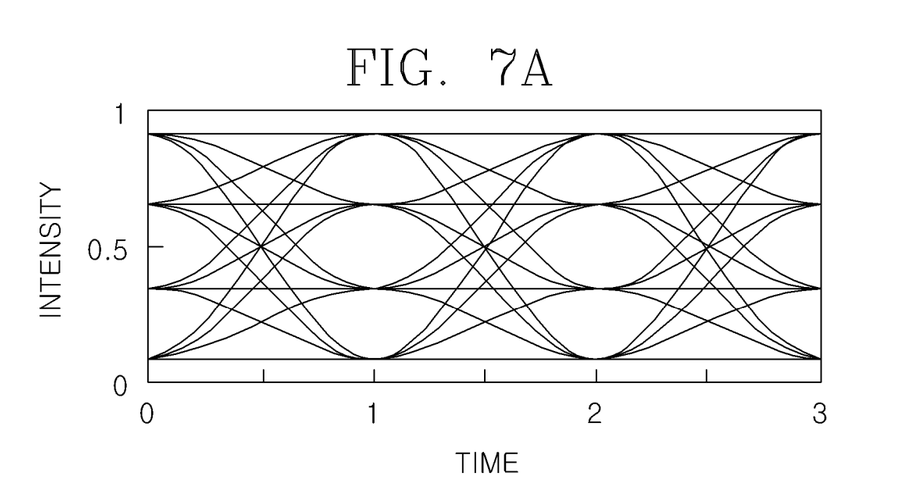
FIGS. 7A and 7B are eye diagrams of a time-division multiplexed PAM4 optical signal derived through a simulation when two RZ optical signals are operated according to an embodiment of the disclosure.
Figure 7B:
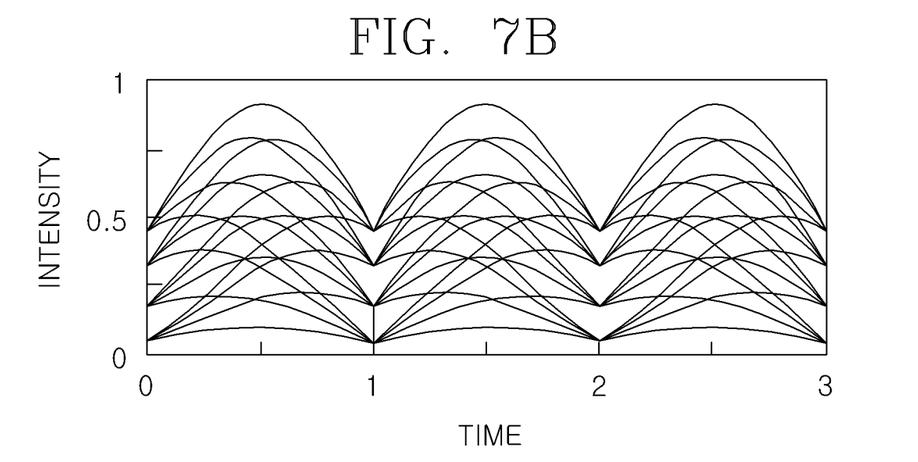

FIGS. 7A and 7B are eye diagrams of a time-division multiplexed PAM4 optical signal derived through a simulation when two RZ optical signals are operated according to an embodiment of the disclosure.

FIG. 7A is an eye diagram of a time-division multiplexed PAM4 optical signal derived through a simulation when two RZ optical signals are operated in different domains according to an embodiment of the disclosure, and FIG. 7B is an eye diagram of a time-division multiplexed PAM4 optical signal derived through a simulation when two RZ optical signals are operated in the same domain.

The optical signals of FIG. 7A are generated using three Mach-Zehnder modulators. A sinusoidal electrical signal is applied to a Mach-Zehnder modulator, thereby generating an optical pulse with an infinite extinction ratio. A four-level electrical signal is applied to two Mach-Zehnder modulators using the generated optical pulse, thereby generating two RZ-PAM4 optical signals, and the two signals are operated in different I/Q domains, followed by time-division multiplexing. Here, it is assumed that the bandwidths of the two Mach-Zehnder modulators generating the RZ-PAM4 signals are infinite. This assumption is reasonable because limiting the bandwidth of a modulator can increase the extinction ratio by applying an electrical signal with a larger amplitude. The amplitude of the electrical signal applied to the modulator is 0.6V (V: half-wave voltage). Since the extinction ratio of the used optical pulses is infinite, no ISI occurs in the multiplexed PAM4 signals.

The optical signals of FIG. 7B are also generated using three Mach-Zehnder modulators, but two RZ-PAM4 signals are operated in the same I/Q domain, followed by time-division multiplexing. Here, a beating occurs in a symbol transition area, and thus the signals are significantly distorted.

Referring to FIGS. 7A and 7B, when time-division multiplexing is performed using a sinusoidally modulated pulse, performance is significantly improved by operating the generated two RZ signals in different spatial modes, polarizations, or I/Q domains, followed by the time-division multiplexing.

Figure 8:
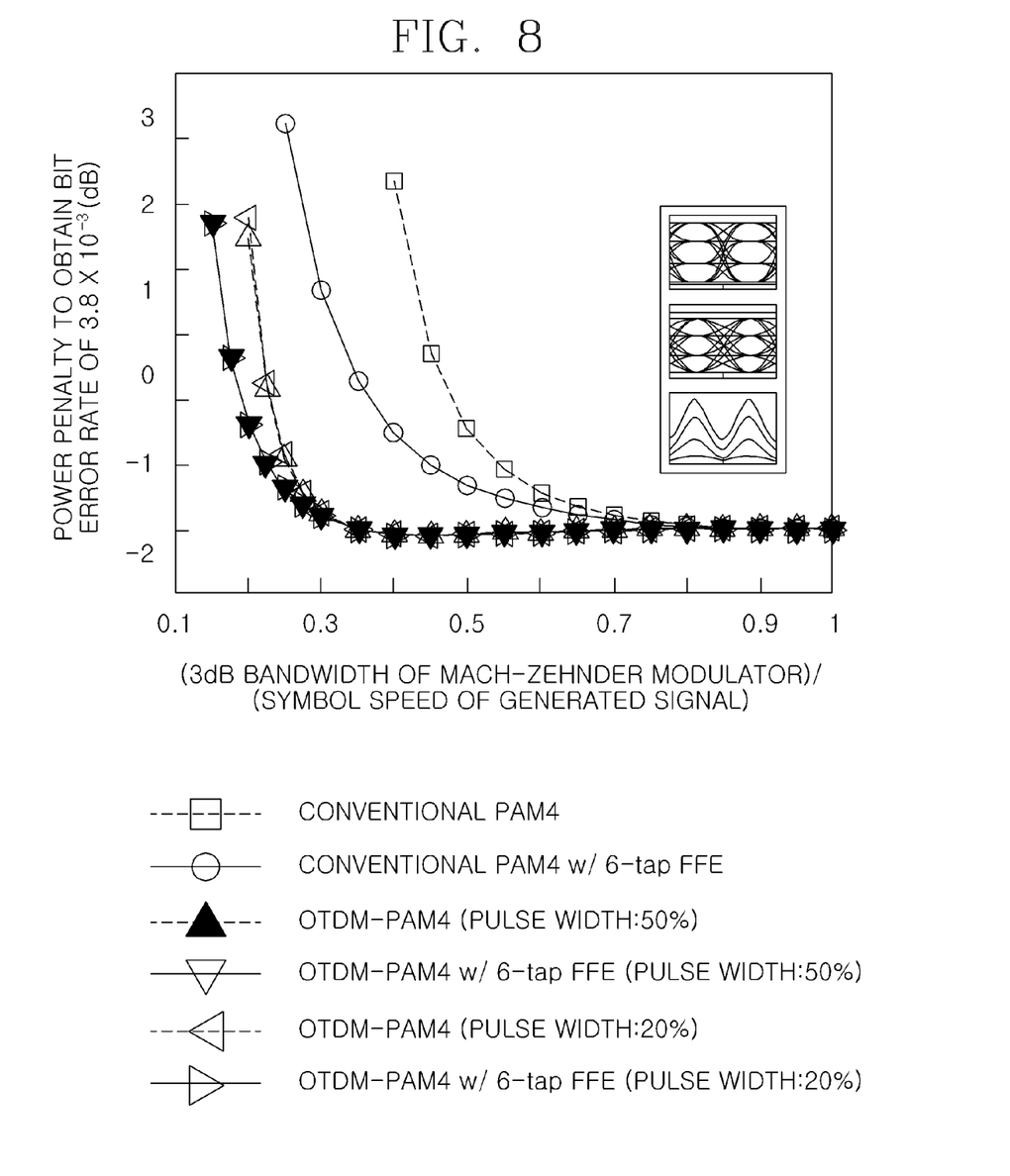
FIG. 8 is a graph illustrating the result of simulating the quality of a signal according to the bandwidth of an optical modulator according to an embodiment of the disclosure.

FIG. 8 is a graph illustrating the result of simulating the quality of a signal according to the bandwidth of an optical modulator according to an embodiment of the disclosure.

FIG. 8 is a graph illustrating a simulation result of comparing bandwidth requirements of modulators required when a PAM4 signal generated by a conventional method using only one modulator and a PAM4 signal generated by applying a time-division-multiplexed technique according to the method proposed in the disclosure are each received by a single optical receiver in order to prove the excellence of the disclosure. To emphasize the excellence of the disclosure, the performance of a PAM4 signal having been subjected to time-division-multiplexed using a pulse having a pulse width of 20% of a pulse period is also compared.

To compare the bandwidth requirements of the modulators, optical power penalties required to obtain a bit error rate of $3.8 \times 10^{-3}$ according to a 3-dB bandwidth of the modulator are compared. In this simulation, an optical pulse with an infinite extinction ratio is used, and the frequency response of the modulator follows a quadratic Bessel function. A 3-dB bandwidth of an optical detector is equal to the symbol rate of the PAM4 signal.

Comparing the PAM4 signal generated by the conventional method with the PAM4 signal generated by the method proposed in the disclosure, it is identified that the disclosure achieves a double gain in terms of modulator bandwidth. Even when a 6-tap linear equalizer is applied to further overcome bandwidth limitation of a modulator, the method proposed in the disclosure still achieves a double gain in terms of modulator bandwidth.

Comparing with an optical-time-division-multiplexed system using the pulse having the pulse width of 20% of the pulse period, the optical-time-division-multiplexed system exhibits the same performance as the method of the disclosure in terms of bandwidth. However, the pulse used in the disclosure can be generated with a very simple structure, thus being more beneficial in terms of cost/energy.

The apparatuses described above may be configured as a hardware component, a software component, and/or a combination of a hardware component and a software component. For example, the apparatuses and components described in the embodiments may be configured using one or more general-purpose or special-purpose computers, for example, a processor, a controller, an arithmetic logic unit (ALU), a digital signal processor, a microcomputer, a field programmable array (FPA), a programmable logic unit (PLU), microprocessor, or any other device capable of executing and responding to an instruction. A processing device may execute an operating system (OS) and one or more software applications running on the operating system. The processing device may also access, store, manipulate, process, and generate data in response to execution of software. For convenience of understanding, although it is described that one processing device is used, a person having ordinary skill in the art will recognize that the processing device may include a plurality of processing elements and/or a plurality of types of processing elements. For example, the processing device may include a plurality of processors or one processor and one controller. Further, a different processing configuration, such as a parallel processor, is also possible.

The software may include a computer program, a code, an instruction, or a combination of one or more thereof, and may configure the processing device to operate as desired or may independently or collectively give an instruction to the processing device. The software and/or data may be embodied in any kind of machine, component, physical device, virtual equipment, computer storage medium, or device to be interpreted by the processing device or to provide an instruction or data to the processing device. The software may be distributed on a computer system connected via a network and may be stored or executed in a distributed manner. The software and data may be stored in one or more computer-readable recording media.

The methods according to the embodiment may be configured in the form of program instructions that can be executed through various computer devices and may be recorded in a computer-readable medium. The computer-readable medium may include a program instruction, a data file, a data structure, and the like alone or in combination. The program instruction recorded in the medium may be specially designed and configured for the embodiments, or may be known and available to those skilled in computer software. Examples of the computer-readable recording medium include magnetic media, such as a hard disk, a floppy disk, and a magnetic tape, optical media, such as a CD-ROM and a DVD, magneto-optical media, such as a floptical disk, and a hardware device specially configured to store and perform a program instruction, such as a ROM, a RAM, and a flash memory. Examples of the program instruction include not only a machine code made by a compiler but also a high-level language code executable by a computer using an interpreter.

Although the embodiments have been described with reference to limited embodiments and drawings as above, various modifications and variations are possible from the above description by those skilled in the art. For example, even though the described techniques are performed in a different order from that in the described methods, and/or the components of the described system, structure, apparatus, circuit, and the like are coupled or combined in a different form from that in the described methods or are replaced or substituted by other components or equivalents, an appropriate result may be achieved.

Therefore, other configurations, other embodiments, and equivalents to the claims are also within the scope of the following claims.

The invention claimed is:

1. An optical-time-division-multiplexed transmission system comprising:
   an optical-time-division-multiplexed transmitter to generate an optical-time-division-multiplexed multi-level pulse-amplitude modulation (PAM) optical signal by applying a sinusoidal electrical signal, a first multi-level electrical PAM signal, and a second multi-level electrical PAM signal, wherein the optical-time-division-multiplexed transmitter comprises:
      a first external modulator to modulate an optical output of a laser using a sinusoidal electrical signal to generate a sinusoidally modulated optical pulse,
      an optical splitter to split the generated optical pulse into a first optical pulse and a second optical pulse,
      a second external modulator to modulate the first optical pulse by applying the first multi-level electrical PAM signal,
      a third external modulator to modulate the second optical pulse by applying the second multi-level electrical PAM signal,
      a time delay to subject the first optical pulse, modulated by the second external modulator, to a time delay by half a pulse period so that the multiplexed optical pulses are orthogonal to each other in a time domain, and an optical coupler to generate an optical-time-division-multiplexed signal by combining the time-delayed first optical pulse and the second optical pulse; and an optical detector to convert the optical-time-division-multiplexed PAM signal transmitted through an optical fiber into an electrical signal.

2. The optical-time-division-multiplexed transmission system of claim 1, wherein the optical-time-division-multiplexed transmitter further comprises:

a domain converter to convert the domain of the second optical pulse, modulated by the third external modulator, so that the multiplexed optical pulses also operate in mutually orthogonal domains including I/Q, different polarizations, or spatial modes, wherein the optical coupler generates the optical-time-division-multiplexed signal by combining the time-delayed first optical pulse and the domain-converted second optical pulse.

3. The optical-time-division-multiplexed transmission system of claim 1, wherein, to resolve the limitation of the extinction ratio of the sinusoidally modulated optical pulse that occurs by the bandwidth limitation of the external modulators, external modulators having a nonlinear transfer function are used, and a sinusoidal electrical signal with a predetermined amplitude or larger is applied so that the transfer function of the external modulators operate in the nonlinear region.

4. The optical-time-division-multiplexed transmission system of claim 3, further comprising:

a time-division demultiplexer to demultiplex the electrical signal detected by the optical detector into two signals and to apply a multiple-input multiple-output (MIMO) equalizer to the signals; and two decision elements to determine the levels of the two demultiplexed signals received from the MIMO equalizer.

5. The optical-time-division-multiplexed transmission system of claim 1, further comprising:

a time-division demultiplexer to demultiplex the electrical signal detected by the optical detector into two signals and to apply a multiple-input multiple-output (MIMO) equalizer to the signals; and two decision elements to determine the levels of two demultiplexed signals received from the MIMO equalizer.

6. An optical-time-division-multiplexed transmission system comprising:

an optical-time-division-multiplexed transmitter to generate an optical-time-division-multiplexed multi-level pulse-amplitude modulation (PAM) optical signal by applying a sinusoidal electrical signal, a first multi-level electrical PAM signal, and a second multi-level electrical PAM signal, wherein the optical-time-division-multiplexed transmitter comprises:

a directly modulated laser to generate a sinusoidally modulated optical pulse by applying a sinusoidal electrical signal to the laser;

an optical bandpass filter to pass only a wavelength component having a predetermined intensity or higher among the generated optical pulse to increase the extinction ratio of the optical pulse;

an optical splitter to split the optical pulse that has passed through the optical bandpass filter into a first optical pulse and a second optical pulse;

a first external modulator to modulate the first optical pulse by applying the first multi-level electrical PAM signal; and a second external modulator to modulate the second optical pulse by applying the second multi-level electrical PAM signal.

7. The optical-time-division-multiplexed transmission system of claim 6, wherein the optical-time-division-multiplexed transmitter further comprises:

a time delay to subject the first optical pulse, modulated by the first external modulator, to a time delay by half a pulse period so that the multiplexed optical pulses are orthogonal to each other in the time domain.

8. The optical-time-division multiplexed transmission system of claim 7, further comprising:

a time-division demultiplexer to demultiplex the electrical signal detected by the optical detector into two signals and to apply a multiple-input multiple-output (MIMO) equalizer to the signals; and two decision elements to determine the levels of two demultiplexed signals received from the MIMO equalizer.

9. The optical-time-division-multiplexed transmission system of claim 7, wherein the optical-time-division-multiplexed transmitter further comprises:

a domain converter to convert a domain of the second optical pulse, modulated by the second external modulator, so that the multiplexed optical pulses also operate in mutually orthogonal domains including I/Q, different polarizations, or spatial modes; and an optical coupler to generate an optical-time-division multiplexed optical signal by combining the time-delayed first optical pulse and the domain-converted second optical pulse.

10. An optical-time-division-multiplexed transmission method comprising:

generating an optical-time-division-multiplexed multi-level pulse-amplitude modulation (PAM) optical signal through an optical-time-division-multiplexed transmitter by applying a sinusoidal electrical signal, a first multi-level electrical PAM signal, and a second multi-level electrical PAM signal, wherein the generating comprises:

generating a sinusoidally modulated optical pulse by modulating an optical output of a laser with the sinusoidal electrical signal through a first external modulator, splitting the generated optical pulse into a first optical pulse and a second optical pulse through an optical splitter, modulating the first optical pulse through a second external modulator by applying the first multi-level electrical PAM signal; and modulating the second optical pulse through a third external modulator by applying the second multi-level electrical PAM signal, subjecting the first optical pulse, modulated by the second external modulator, to a time delay by half a pulse period through a time delay so that the optical pulses are orthogonal to each other in a time domain, and generating an optical-time-division-multiplexed signal through an optical coupler by combining the time-delayed first optical pulse and the second optical pulse; and receiving the generated optical PAM signal and converting the received optical PAM signal into an electrical PAM signal through an optical detector.

11. The optical-time-division-multiplexed transmission method of claim 10, wherein the generating of the optical-time-division-multiplexed multi-level PAM optical signal through the optical-time-division-multiplexed transmitter by applying the sinusoidal electrical signal, the first multi-level electrical PAM signal, and the second multi-level electrical PAM signal further comprises:

converting a domain of the second optical pulse, modulated by the third external modulator, through a domain converter so that the multiplexed optical pulses also operate in mutually orthogonal domains including I/Q, different polarizations or spatial modes; and wherein the generating of the optical-time-division-multiplexed signal through the optical coupler comprises generating the optical-time-division-multiplexed signal by combining the time-delayed first optical pulse and the domain-converted second optical pulse.

12. The optical-time-division multiplexed transmission method of claim 10, further comprising:

demultiplexing the electrical signal detected by the optical detector into two signals through a time-division demultiplexer; and applying a multiple-input multiple-output (MIMO) equalizer to the signals; and receiving the demultiplexed two signals from the MIMO equalizer and determining the levels of the two signals by using two different decision elements.

13. An optical-time-division-multiplexed transmission method comprising: generating of an optical-time-division-multiplexed multi-level pulse-amplitude modulation (PAM) optical signal through an optical-time-division-multiplexed transmitter by applying a sinusoidal electrical signal, a first multi-level electrical PAM signal, and a second multi-level electrical PAM signal, receiving the generated optical PAM signal and converting the received optical PAM signal into an electrical PAM signal through an optical detector, the generating comprises:

generating a sinusoidally modulated optical pulse by applying the sinusoidal electrical signal through a directly modulated laser;

increasing the extinction ratio of the optical pulse by passing only a wavelength component having a predetermined intensity or higher among the generated optical pulse through an optical bandpass filter;

splitting the optical pulse that has passed through the optical bandpass filter into a first optical pulse and a second optical pulse through an optical splitter;

modulating the first optical pulse through a first external modulator by applying a first multi-level electrical PAM signal; and modulating the second optical pulse through a second external modulator by applying a second multi-level electrical PAM signal.

14. The optical-time-division-multiplexed transmission method of claim 13, wherein the generating of the optical-time-division-multiplexed multi-level PAM optical signal through the optical-time-division-multiplexed transmitter by applying the sinusoidal electrical signal, the first multi-level electrical PAM signal, and the second multi-level electrical PAM signal further comprises:

subjecting the first optical pulse, modulated by the second external modulator, to a time delay by half a pulse period through a time delay so that the optical pulses are orthogonal to each other in the time domain;

converting a domain of the second optical pulse, modulated by the second external modulator, through a domain converter so that the multiplexed optical pulses also operate in mutually orthogonal domains including I/Q, different polarizations or spatial modes; and generating an optical-time-division-multiplexed signal through an optical coupler by combining the time-delayed first optical pulse and the domain-converted second optical pulse.

15. The optical-time-division multiplexed transmission method of claim 14, further comprising:

demultiplexing the electrical signal detected by the optical detector into two signals through a time-division demultiplexer; and applying a multiple-input multiple-output (MIMO) equalizer to the signals; and receiving the demultiplexed two signals from the MIMO equalizer and determining the levels of the two signals by using two different decision elements.

* * * * *